Patented May 13, 1941

2,241,927

UNITED STATES PATENT OFFICE 2,241,927

PROCESS OF PREPARING AMINO ACIDS

Melville Sahyun, Detroit, Mich.

No Drawing. Application September 6, 1939,
Serial No. 293,575

3 Claims. (Cl. 260—529)

This invention relates to the preparation of a solution containing a mixture of amino acids suitable for parenteral administration and useful for therapeutic purposes. These amino acids are particularly useful in maintaining a nitrogen balance in the system of individuals undergoing surgical operations, in individuals who are unable to receive food orally, in individuals suffering from malnutrition and in elevating serum proteins in individuals suffering from hypoproteinemia.

Protein is a component of every living cell. Therefore, an adequate supply of nitrogen is a prerequisite for all living organisms. Protein molecules consist of a chemical combination of simpler molecules known as amino acids. Each of these amino acids contains one or more nitrogen groups in one form or another that furnishes the organism with its selective nitrogen requirement.

From a nutritional point of view, amino acids may be divided into two classes:

(1) Indispensable amino acids, and
(2) Dispensable amino acids.

(1) Indispensable amino acids may be defined, with respect to the requirements of the living animal, as those amino acids that must be present in the diet and cannot under any circumstances be synthesized by the body or replaced by other amino acids. Their absence from the diet leads to death. Lysine, tryptophane, histidine, phenylalanine, leucine, isoleucine, threonine, methionene, valine, and arginine are such amino acids.

(2) Dispensable amino acids are often referred to as non-essential with respect to the requirements of the living animal. While their presence in the diet serves a useful purpose, yet one such amino acid may be substituted for another without causing any deleterious effect. As an example, glycine may be omitted entirely from the diet and its nitrogen equivalent may be derived from alanine. Glycine, alanine, serine, norleucine, aspartic acid, glutamic acid, hydroxy-glutamic acid, proline, hydroxpyroline, citrulline, tyrosine and cystine are such dispensable or non-essential amino acids.

A suitable and useful solution of a mixture of amino acids that is to be used effectively for parenteral administration must contain all the indispensable amino acids hereabove listed and an adequate supply of the dispensable amino acids in order to supply the amino acid requirements.

Proteins cannot be administered parenterally in sufficient quantities for the purposes of supplying the nitrogen requirement for the living organism. On the other hand, the constituents of such protein can be safely injected provided that:

(a) An adequate supply of all the indispensable amino acids are present in the solution to be administered;

(b) The solution containing a mixture of these amino acids has been properly prepared with respect to concentration, bearing in mind that many of the individual amino acids are highly insoluble and tend to come out of solution;

(c) The concentration of amino acids in solution has been adjusted so as to render them utilizable by the system with the minimum amount of loss through the kidneys;

(d) The acidity and tonicity of the solution is fairly well controlled;

(e) The solution containing a mixture of amino acids is sterile and free from harmful bactericidal reagents and inorganic salts; and (f) The solution is free from pyrogens, or the bodies of dead bacteria.

Three methods are known for obtaining amino acids from proteins. They are:

*Acid hydrolysis.*—This method consists in boiling the protein in the presence of a strong acid, such as sulfuric acid or hydrochloric acid, for a certain length of time. When this is done, the molecule of the protein is broken down into its respective constituents. Thus the hydrolysate is made to consist of a mixture of amino acids in a strongly acid solution. While this procedure is excellent in many respects, it causes the destruction of some valuable amino acids such as tryptophane. Tryptophane is for nutrition an indispensable amino acid, and its absence from the mixture renders the product almost valueless for the purposes of maintaining nitrogen balance or for elevating serum proteins.

*Hydrolysis with alkalies.*—This method consists in boiling proteins in the presence of such strong alkalies as sodium hydroxide, potassium hydroxide or barium hydroxide, etc. This method is unsatisfactory because certain amino acids such as arginine and lysine are thereby destroyed.

*Enzyme hydrolysis.*—This sort of hydrolysis would be ideal for my purposes were it not for the fact that it has not yet been possible to obtain a complete hydrolysis of proteins with any of the well known enzymes.

In order to have a suitable preparation of amino acids in solution that is useful for clinical therapy, a practical method for preparing it is needed, and this method should permit all the indispensable amino acids to remain in the final product; it should be practical and inexpensive; and should include a simple and convenient way for the removal of acids or alkalies used in the hydrolysis of the proteins.

The present invention fulfils these requirements and produces desirable and satisfactory products for the intended use.

In carrying out this invention, an aqueous solution containing a mixture of the desirable amino acids is prepared by hydrolysing with an aqueous solution of a strong acid such as sulfuric acid, for example, a batch of one or more of the proteins which have all the amino acids in their constituents that are indispensable for nutrition, and hydrolysing with an aqueous solution of a strong alkali such as barium hydroxide, for example, a similar or like batch, using elevated temperature and pressure when necessary. The batches are then mixed and the mixture brought to neutrality or only slight alkalinity and the salts are removed leaving a mixture containing the desired amino acids.

More particularly, in carrying out the invention, one or more proteins, such as casein or casein and albumin, for example, may be used as starting materials. It is essential in the selection of these proteins that all the indispensable amino acids must be present in their several constituents. The material to be used is divided into two lots, A and B. Lot A is treated with sulfuric acid and lot B with barium hydroxide, bearing in mind that the amount of alkali used in lot B is to be just about sufficient to neutralize the sulfuric acid in lot A. Each lot is placed in a suitable container and simultaneously subjected to hydrolysis under pressure and high temperature for about ten hours. After the completion of hydrolysis, lot A is added or mixed with lot B. By so doing, the sulfuric acid in lot A is neutralized with the barium hydroxide used in lot B. In this way economy in the used acid and alkali is effected, and a mixture of amino acids is obtained that contains all the indispenable and dispensable amino acids free from salts and impurities. Also, a considerable amount of labor and time are thus saved, thereby reducing the cost of the final product.

The following is given as a specific example of carrying out the process, but it is to be understood that the invention is not limited to the details given in the example, or to the particular materials used, or proportion of materials used or the exact time or temperature or the type of apparatus used:

Example:

Lot A.—Into about 40 liters of 5 normal sulfuric acid, 10 kilograms of a protein such as casein are introduced and mixed therewith.

Lot B.—Into about 35 liters of distilled water, 20 kilograms of barium hydroxide and 10 kilograms of casein are introduced and mixed therewith.

Lot A and lot B are placed in suitable separate containers, and these containers are placed in an autoclave and subjected to steam under pressure. The temperature and pressure are gradually increased so that by the end of an hour or slightly longer the temperature registers about 260° F. and the pressure about 20 lbs. per square inch. This temperature and this pressure are maintained for about 8 to 10 hours. The steam is then shut off, and the containers are allowed to cool gradually over night. On the following day, the contents of one container are cautiously poured into and well mixed with the contents of the other. After mixing, the acidity of the solution is tested and adjusted with either sulfuric acid or barium hydroxide, as the need may be, so that it will be alkaline to phenolphthalein. The alkaline solution containing the mixture of amino acids of both hydrolysates is separated from the solid barium sulphate by any convenient method and the latter washed with about 50 liters of distilled water, preferably hot. The washings are added to the solution of amino acids, and placed in a still and concentrated in vacuum at a temperature of about 50° C. to drive off the ammonia that was formed during the process of hydrolysis. After the removal of ammonia, the mixture of amino acids in solution is removed from the still and placed in suitable containers and treated with a sufficient amount of sulfuric acid to remove the last traces of barium. At this stage it is preferable to test the solution for sulfate with baryta. It has been found to be safer to allow sulfate to be present in amounts not to exceed 0.1 mg. per 1 cc., thus insuring the absence of barium ions from the solution. About 500 to 1000 grams of activated carbon are then added and mixed, the whole mixture is filtered and the filtrate is made up to a volume of about 120 liters by the addition of double distilled water. The nitrogen content of the final mixture of amino acids varies from batch to batch, depending largely on the care with which the process is carried out. It usually runs about 1.5 percent nitrogen, which represents about 11 to 12 percent amino acids in the solid form.

In making the final preparation of amino acids in solution, I may add each of the following either separately or together: (a) inorganic ingredients that enter into the composition of Ringer's solution (sodium chloride 0.7 percent; potassium chloride 0.03 percent or potassium gluconate 0.09 percent; calcium chloride 0.02 percent and sodium bicarbonate 0.003 percent); and (b) a carbohydrate of the nature of dextrose to the extent of 5 to 10 percent of the final concentration. The final nitrogen content may be about one percent.

A concentration of about one percent nitrogen in the final mixture has been found to be of considerable aid to the physician, for it enables him to predetermine in terms of calories the amount required by the patient. The addition of glucose to the final mixture enables the patient to receive simultaneously in one injection his carbohydrate requirement, thus dispensing with another operation of this nature. The final product is sterilized and placed in sterile containers ready for use.

What is claimed is:

1. The process of producing by hydrolysis a preparation containing all of the indispensible amino acids which comprises, treating a protein containing all of the indispensible amino acids with an aqueous solution of a mineral acid under hydrolyzing conditions, separately treating an additional quantity of such protein with an aqueous solution of an alkali under hydrolyzing conditions, comingling the aforesaid reaction mixtures after the hydrolysis has taken place in such proportions that the final product is substantially neutral, and separating the amino acids in the reaction product from the mineral acid salt.

2. The process of producing by hydrolysis a preparation containing all of the indispensible amino acids which comprises, treating a protein containing all of the amino acids necessary for animal nutrition with an aqueous solution of mineral acid under hydrolyzing conditions, separately treating an additional quantity of such protein with an aqueous solution of an alkali under hydrolyzing conditions, comingling the aforesaid reaction mixtures after the hydrolysis has taken place in such proportions that final product is substantially neutral, adjusting the pH of the reaction product to supply alkalinity, and separating the amino acids in the reaction product from the mineral acid salt.

3. In a method of producing a mixture of indispensible amino acids from casein, the steps which include, hydrolyzing a quantity of casein with an aqueous solution of a mineral acid, separately hydrolyzing another quantity of casein with an aqueous alkali, comingling the hydrolysates in proper proportion to produce substantially a neutral reaction product, and separating the amino acids from the mineral acid salt.

MELVILLE SAHYUN.